United States Patent [19]

Mercer

[11] 4,045,541

[45] Aug. 30, 1977

[54] CARBONYLATION PROCESS

[75] Inventor: David L. Mercer, Wainfleet, Canada

[73] Assignee: The International Nickel Company, Inc., New York, N.Y.

[21] Appl. No.: 620,157

[22] Filed: Oct. 6, 1975

[30] Foreign Application Priority Data

June 25, 1975   Canada ................................. 230113

[51] Int. Cl.² .............................................. C01G 1/04
[52] U.S. Cl. .................................... 423/417; 423/149
[58] Field of Search .............. 423/416, 417, 149, 561; 75/.5 AA

[56] References Cited

U.S. PATENT DOCUMENTS

| 1,909,762 | 5/1933 | Mercer | 423/138 |
|---|---|---|---|
| 2,835,557 | 5/1958 | West et al. | 423/149 |

Primary Examiner—O. R. Vertiz
Assistant Examiner—Gregory A. Heller
Attorney, Agent, or Firm—Francis J. Mulligan, Jr.; Ewan C. MacQueen

[57] ABSTRACT

A carbonylation process involving reacting metallic nickel and a preferential sulfide former in a special chamber with a gas stream containing carbon monoxide and small amounts of hydrogen sulfide, the gases being mixed in or adjacent the chamber, to form a product gas stream containing nickel carbonyl substantially devoid of sulfur compounds.

5 Claims, No Drawings

CARBONYLATION PROCESS

The present invention is concerned with production of metallic carbonyls and more particularly with efficient production of iron and nickel carbonyls.

The practical art of extracting nickel, iron, etc. from materials containing these elements by means of formation of volatile compounds of metal and carbon monoxide (metallic carbonyls) dates from the last decade of the nineteenth century. Since then various proposals have been made (and some adopted) to enhance the efficiency of the process. Particularly pertinent to the process of the present invention are the proposals made by

| C. Grieb | U.S. Patent No. | 1,909,762 |
| Brassert & Co. | French Patent No. | 879,693 |
| West el al | U.K. Spec. No. | 769,099 |
| Queneau et al | U.K. Spec. No. | 856,425 | and Heinicke et al, Zeitschrift fur anorganische and allgemeine Chemie, Band 352, 1967 PN. 168-183.

All of the aforelisted proposals disclose in one way or another that sulfides and particularly hydrogen sulfide can be used to enhance the reactivity of carbon monoxide with reduced metallic constituents in a nickel-containing mixture. While the prior art suggestions embody the principle of employing hydrogen sulfide in a carbon monoxide gas stream used for carbonylation, these suggestions do not disclose any specific means or methods whereby efficient nickel separation as nickel carbonyl can be maximized and at the same time potentially dangerous conditions can be avoided.

Efficient nickel separation of course implies the rapid formation of nickel carbonyl at the least rigorous conditions along with maximization of nickel recovery as carbonyl. Avoidance of a potentially dangerous condition refers particularly to the fact that a mixture of carbon monoxide and hydrogen sulfide is quite corrosive to steel, forming even at moderate pressure conditions, iron carbonyl and an iron sulfidic product. Such corrosion, if permitted to occur in gas feed and exit lines, could reduce the capacity of the feed and exit lines to resist pressure.

It is an object of the present invention to provide a novel process for production of nickel carbonyl.

Other objects and advantages will become apparent from the following description.

Generally speaking the present invention contemplates a process wherein a mass comprising elemental nickel, intimately mixed with an effective amount of at least one substance, which forms sulfides more readily than nickel in the temperature range of up to about 200° C is confined in a pressure retaining enclosure having walls chemically resistant to carbonylation and sulfidation, and having a gas entry port and a gas exit port, mixing in said enclosure or in an extension thereof having walls chemically resistant to carbonylation and sulfidation, a first gas stream containing carbon monoxide and devoid of hydrogen sulfide and a second gas stream containing hydrogen sulfide and devoid of carbon monoxide, to provide a mixed gas stream containing about 0.01% to about 0.5% hydrogen sulfide (based upon volume of carbon monoxide), reacting said mixed gas stream with said mass in said enclosure while maintaining the pressure in said enclosure at about 1 to about 70 atmospheres absolute and while maintaining the temperature in said enclosure at about 40° C to about 200° C to form nickel carbonyl and non-nickel sulfides in said enclosure and withdrawing nickel carbonyl along with other volatile carbonyls from said enclosure through said gas exit port in a gas stream devoid of sulfur components.

Looking at the process of the present invention in a more particular manner, the mass comprising elemental nickel intimately mixed with an effective amount of at least one substance, which forms sulfides more readily than nickel at low temperature is advantageously a selectively reduced, crude nickel oxide material which contains iron, cobalt, copper and other elements in addition to nickel. Contrary to teachings in the prior art regarding criticality of reducing conditions, crude nickel oxide material (e.g., sinter) can be reduced at any convenient temperature from as low as 300° C up to 1000° C and even higher and still be employed as useful feed material in the process of the present invention using carbonylation pressures (i.e. partial pressure of carbon monoxide) of up to about 12 atmospheres. Even metallics which have been granulated from the molten state are satisfactory solid feed for the process of the present invention, but these require carbonylation pressures of about 25 to 30 atmospheres absolute to ensure reasonable reaction rates with even higher pressures giving higher reaction rates. Thus, the process of the present invention is advantageous in permitting rapid pre-reductions in apparatus having relatively low capital costs for any given throughput capacity.

While the solid feed to the process of the present invention does not need to contain sulfur, it is necessary that the solid feed contain, in addition to nickel, an amount of sulfide former, e.g., iron, copper or cobalt sufficient to sponge up as sulfide the sulfur introduced into the reactor as hydrogen sulfide. The theoretical amount of sulfur-entrapping material necessary is calculated on the basis that 4 moles of carbon monoxide are necessary to volatilize one mole of nickel. If hydrogen sulfide is introduced into the reactor in an amount of about $1 \times 10^{-4}$ to about $5 \times 10^{-3}$ mole per mole of carbon monoxide, then about $4 \times 10^{-4}$ to about $2 \times 10^{-2}$ mole of metal capable of forming a sulfide of the character MeS must be present for each mole of nickel volatilized. This is an absolute theoretical minimum necessary amount which in practice will be exceeded by a factor of at least 2 and even up to 10,000 to ensure complete removal of the $H_2S$ from the CO, carbonyl exit gas stream. Thus, a sulfide former such as iron is advantageously present in the nickel-containing feed material in an amount of at least one half mole per each 100 moles of nickel. The sulfide former should be intimately mixed with the nickel at the atomic level. That is an atom of nickel reacting with 4 molecules of carbon monoxide should be reasonably adjacent an atom of a sulfide former so that the carbonylation-activating sulfur moiety will be able to react with the sulfide former even in the presence of additional nickel. While the exact mechanism of the invention is not fully understood, the likelihood is that the activating sulfur moiety must be at the site of carbonylation during carbonylation and that the mean free path of the activating sulfur moiety is only of the order of magnitude of ten or so nickel atom diameters. Thus, if the degree of distribution of the sulfide former is significantly less than fully random on an atomic scale, either significantly more sulfide former is required than the calculated minimum or alternatively the activating sulfur moiety will react with nickel to form nickel sulfide. If nickel sulfide is formed the amount of nickel tied up with the sulfur will not form nickel carbonyl and, of course, will not be extracted from the solid mass. It is also necessary to maintain a significantly deep bed of sulfide former so as to provide an effective amount of contact time between the sulfur-containing gas stream and the sulfide former to remove all the sulfur from the gas stream.

It is an important feature of the present invention that the walls of the actual carbonylation chambers containing the reacting mass be made of a material resistant to carbonylation and sulfidation. Suitable materials of construction for these walls and the walls of any adjoining chambers wherein mixtures of carbon monoxide and hydrogen sulfide exist are Austenitic stainless steels - AISI 300 series. Ferritic stainless steels - AISI 400 series, low alloy steel, mild steel and iron are not suitable at all. It is essential that sufficient reacting mass be present in the reaction chamber so as to prevent hydrogen sulfide from passing out of the reaction chamber along with nickel carbonyl and other volatile carbonyls. This can be accomplished by continuous feeding of reaction mass into the reaction chamber with the carbon monoxide-hydrogen sulfide mixture countercurrent with the reaction mass, or by careful control of the mixed gas stream at the final stages of batch carbonylation. To avoid control problems in batch operation, a system of several connected batch reactors can be employed. Tail gas from the first reactor is passed through a second reactor containing a fresh batch of nickel and sulfide former to assure removal of sulfur. After carbonylation is completed in the first reactor, the first reactor is taken off-stream, the second reactor then becoming the principle reactor with tail gases being desulfurized in a third reactor.

It is essential, in accordance with the invention, to provide separate gas feed streams of carbon monoxide and hydrogen sulfide and permit mixing only either in the reaction chamber or in an adjacent space walled by suitable materials as set forth hereinbefore. It is especially advantageous to maintain the amount of hydrogen sulfide at about 0.3% by volume of the carbon monoxide. Assuming an excess of nickel and sulfide former, the reaction rate of carbonylation is very rapid even at pressures as slow as atmospheric pressure. Gas pressures in excess of about 11 atmospheres absolute and throughput rates in excess of 40 liters of carbon monoxide (containing 0.5% $H_2S$) per kilogram of nickel in the reactant mass with reduced, sintered oxide feeds are not recommended because above that gas reactant concentration level, pressure, and throughput rate, it becomes very difficult with the usual carbonylation reactor geometry to dissipate the heat of reaction and maintain the temperature in the range of 60° C to about 70° C required at this pressure level. Of course, as those skilled in the art are aware, prematurely raising of the temperatures of a gas stream containing nickel carbonyl will result in thermal decomposition of the compound in the carbonylation chamber and consequent lowering of carbonylation efficiency. The permissible range of temperature for the carbonylation depends upon the pressure. With low pressures only low temperatures are used. At high pressures higher temperatures can also be used.

The carbonylation reactor used in the present invention can be of any conventional configuration. The reactant mass containing nickel can be static as in a batch process or quasi static owing to slow addition of fresh material at the top of a column and slower withdrawal of a nickel-depleted residue at the bottom of the column. Likewise multiple sequential chambers containing quasi static columns of reactant mass can be used. Alternatively, the reactant mass may be fluidized or otherwise levitated to assure good gas-solid contact. Withdrawal of the product gas from the reactor can be at any rate commensurate with heat dissipation to maintain the reactor temperature. The product gas usually contains nickel carbonyl and carbon monoxide, along with other volatile carbonylation products, e.g., iron and cobalt carbonylated compounds derived from the active mass as well as any inert diluent gas employed in the particular process. The product gas contains no hydrogen sulfide so long as adequate amounts of sulfide former as set forth hereinbefore are present in the reactant mass in the carbonylation chamber or in an auxiliary carbonylation chamber.

In order to give those skilled in the art a better understanding and appreciation of the invention the following examples are given.

EXAMPLE I

Samples of NiO containing Cu, Co and Fe were reduced at 400° C using hydrogen as the reactant. The samples were then either sulfided prior to atmospheric carbonylation or carbonylated with the inlet CO containing about 0.05% $H_2S$. The tests were conducted in a batchwise manner at a temperature of 50° C. Results are shown in Table I.

TABLE I

| Carbonylation Time, hours | Sulfur Activation Prior to Carbonylation % Ni Extraction | Sulfur Activation During Carbonylation % Ni Extraction |
|---|---|---|
| 1 | 30 | 15 |
| 2 | 52 | 31 |
| 3 | 67 | 45 |
| 4 | 77 | 57 |
| 5 | 83 | 66 |
| 6 | 87 | 74 |
| 7 | 88 | 80 |
| 8 | 89 | 85 |
| 9 | 89.5 | 89 |
| 10 | 90 | 92 |
| 15 | 91.5 | 97.5 |
| 20 | 92 | 98.5 |
| 24 | 93 | 99 |

| | Cu | Ni | Co | Fe | S |
|---|---|---|---|---|---|
| Typical Feed Analysis Prior to Reduction | % 2.63 | 71.2 | 0.89 | 0.79 | 0.17 |
| Typical Residue After Carbonylation Using New Process | % 25.9 | 7.0 | 7.9 | 5.90 | 14.9 |

EXAMPLE II

Samples of NiO containing Cu, Co and Fe were reduced at 980° C using CO as reductant. The samples were then either sulfided prior to carbonylation or carbonylated with the inlet CO containing about 0.1% $H_2S$. Carbonylation was conducted at 7 atmospheres absolute and a temperature of about 65° C. These tests were conducted in a batchwise manner. Results are shown in Table II.

TABLE II

| Carbonylation Time, hours | Sulfur Activation Prior to Carbonylation % Ni Extraction | Sulfur Activation During Carbonylation % Ni Extraction |
|---|---|---|
| 1 | 22 | 16 |
| 2 | 39 | 34 |

TABLE II-continued

| | | | |
|---|---|---|---|
| 3 | 50 | | 47 |
| 4 | 58 | | 59 |
| 5 | 64 | | 70 |
| 6 | 67 | | 81 |
| 7 | 68 | | 90 |
| 8 | 68.4 | | 95.8 |
| 9 | 68.8 | | 97.7 |
| 10 | 69.0 | | 99.5 |

| | Cu | Ni | Co | Fe | S |
|---|---|---|---|---|---|
| Typical Feed Analysis Prior to Reduction | % 4.4 | 76.0 | 0.5 | 0.7 | 0.2 |
| Typical Residue After Carbonylation with New Process | % 48.4 | 3.8 | 5.08 | 7.36 | 18.0 |

EXAMPLE III

Samples of NiO containing Cu, Co and Fe were reduced at 980° C using Co as reductant. The samples were then either sulfided prior to carbonylation or carbonylated with the inlet CO containing about 0.2% $H_2S$. Carbonylation was conducted at 7 atmospheres absolute and a temperature of about 65° C. These tests were conducted in a batchwise manner. Results are shown in Table III.

TABLE III

| Carbonylation Time, Hours | Sulfur Activation Prior to Carbonylation % Ni Extraction | Sulfur Activation During Carbonylation % Ni Extraction |
|---|---|---|
| 1 | 24 | 33 |
| 2 | 42 | 61 |
| 3 | 54 | 79 |
| 4 | 61 | 89 |
| 5 | 65 | 96 |
| 6 | 67 | 97 |
| 7 | 67.3 | 97.5 |
| 8 | 67.5 | 98.0 |
| 9 | 67.8 | 98.5 |
| 10 | 68 | 99.8 |

| | Cu | Ni | Co | Fe | S |
|---|---|---|---|---|---|
| Typical Feed Analysis Prior to Reduction | % 0.62 | 75.0 | 1.55 | 0.60 | 0.09 |
| Typical Residue After Carbonylation with New Process | % 8.8 | 2.66 | 23.2 | 6.0 | 15.9 |

EXAMPLE IV

Samples of melted and granulated high nickel (75%) metallics were carbonylated in a high pressure vessel at 69 atmospheres absolute, pure CO being used for carbonylation. Other samples were carbonylated at 28 atmospheres absolute with pure CO and with CO containing about 0.2% $H_2S$. Results are shown in Table IV.

TABLE IV

| | 69 Atmosphere Carbonylation with Pure CO T = 175° C | 28 Atmosphere Carbonylation with Pure CO T = 100° C | 28 Atmosphere Carbonylation with $H_2S$ in CO T = 100° C |
|---|---|---|---|
| Carbonylation Time, hours | % Ni Extraction | % Ni Extraction | % Ni Extraction |
| 0.5 | 33 | 8 | 29 |
| 1 | 63 | 17 | 60 |
| 2 | 88 | 46 | 86 |
| 3 | 94 | 62 | 91 |
| 4 | 95 | 70 | 92.5 |
| 5 | 95.5 | 73 | 93.0 |
| 6 | 96 | 76 | 93.5 |
| 7 | 96.5 | 77.5 | 94.0 |
| 8 | 97 | 79 | 94.5 |
| 9 | 97.3 | 79.5 | 95.0 |
| 10 | 97.5 | 80.5 | 96.5 |
| 11 | 98 | 82 | 98 |

| | Cu | Ni | Co | Fe | S |
|---|---|---|---|---|---|
| Typical Feed Analysis to Reactor | % 14.6 | 77.5 | 0.78 | 2.64 | 4.23 |
| Typical Residue Analysis for 98% Extraction | % 60.5 | 6.7 | 3.28 | 7.7 | 17.9 |

The foregoing examples show that with atmospheric pressure carbonylation of nickel oxide sinter reduced at low temperatures the process of the present invention gives significantly better nickel recovery after 15 hours of reaction; that with nickel oxide sinter reduced at 980° C the superiority of the process of the present invention is unmistakable from the onset of the reaction; and that with granulated metallics the process of the present invention carried out at 28 atmospheres pressure is substantially equivalent to the prior art process carried out at 69 atmospheres and significantly better than the prior art process carried out at 28 atmospheres.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for the production of nickel carbonyl wherein a mass comprising elemental nickel intimately mixed with at least one half mole per each 100 moles of nickel of at least one metal which forms sulfides more readily than nickel and is selected from the group of metallic iron, metallic copper and metallic cobalt in the temperature range of up to about 200° C is confined in a pressure retaining enclosure having walls chemically resistant to carbonylation and sulfidation and having a gas entry port and a gas exit port, mixing in said enclosure or in an extension thereof having walls chemically resistant to carbonylation and sulfidation a first gas stream containing carbon monoxide and devoid of hydrogen sulfide and a second gas stream containing hydrogen sulfide and devoid of carbon monoxide to provide a mixed gas stream containing about 0.01% to about 0.5% hydrogen sulfide based upon volume of carbon monoxide, reacting said mixed gas stream with said mass in said enclosure while maintaining the pressure in said enclosure at about 1 to 70 atmospheres absolute, while maintaining the temperatures in said enclosure at about 40° C to about 200° C and while maintaining an excess of metal which forms sulfides more readily than nickel to form nickel carbonyl and non-nickel sulfides and to remove hydrogen sulfide from said gas stream and withdrawing nickel carbonyl along with other volatile carbonyl from said enclosure through said gas exit port in a gas stream devoid of sulfur components.

2. The process as in claim 1 wherein at least about 0.5 mole of iron is copresent with each 100 moles of nickel.

3. The process as in claim 1 wherein the elemental nickel is present in the form of reduced nickel oxide.

4. The process as in claim 1 wherein the elemental nickel is present as granulated metallics and carbonylation is carried out at a partial carbon monoxide pressure of up to 70 atmospheres absolute.

5. The process as in claim 1 carried out batchwise and wherein gases exiting from a batch reactor enter a second reactor containing nickel and said metal which forms sulfides more readily than nickel to strip sulfur from said gases.

* * * * *